United States Patent
Droger et al.

(10) Patent No.: US 10,526,523 B2
(45) Date of Patent: Jan. 7, 2020

(54) RELEASE OF EXPANSION AGENTS FOR WELL CEMENTING

(71) Applicant: SCHLUMBERGER TECHNOLOGY CORPORATION, Sugar Land, TX (US)

(72) Inventors: Nicolas Droger, Clamart (FR); Mickael Allouche, Clamart (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 16/077,498

(22) PCT Filed: Feb. 11, 2016

(86) PCT No.: PCT/IB2016/000270
§ 371 (c)(1),
(2) Date: Aug. 13, 2018

(87) PCT Pub. No.: WO2017/137789
PCT Pub. Date: Aug. 17, 2017

(65) Prior Publication Data
US 2019/0048250 A1    Feb. 14, 2019

(51) Int. Cl.
*E21B 33/14* (2006.01)
*E21B 33/138* (2006.01)
(Continued)

(52) U.S. Cl.
CPC .............. *C09K 8/473* (2013.01); *C04B 38/02* (2013.01); *E21B 33/14* (2013.01)

(58) Field of Classification Search
CPC ....... C04B 28/02; E21B 33/12; E21B 33/127; E21B 43/103; E21B 43/106;
(Continued)

(56) References Cited

U.S. PATENT DOCUMENTS

| | | | |
|---|---|---|---|
| 1,265,655 A | 5/1918 | Henderson et al. | |
| 1,344,461 A | 6/1920 | Thomas et al. | |

(Continued)

FOREIGN PATENT DOCUMENTS

| | | |
|---|---|---|
| CN | 104692694 A | 6/2015 |
| DE | 3704783 A1 | 8/1988 |

(Continued)

OTHER PUBLICATIONS

Jin et al., "Preparation, characterization and application of octadecyl modified magnesium oxide microspheres", Analytica Chemica Acta, vol. 693, pp. 54-61, 2011.
(Continued)

*Primary Examiner* — Zakiya W Bates (57) ABSTRACT

Pre-stressed cementing methods involve preparing a cement slurry containing water, inorganic cement, and capsules of an expanding agent. The slurry is placed in an annular region in the well and hardened. Expansion of the set cement is delayed. Water infiltration activates the expanding agent to rupture the capsules and release the expanding agent. The expanding agent reacts to expand the set cement to a state of compression within the annular region. The state of compression can be maintained during changes in casing dimensions from temperature or pressure, mechanical disturbance, or mud contamination. The state of compression in the annular region may be monitored by acoustic impedance measurements.

3 Claims, 5 Drawing Sheets

(51) Int. Cl.
*C09K 8/473* (2006.01)
*C04B 38/02* (2006.01)

(58) Field of Classification Search
CPC ...... E21B 43/108; E21B 33/138; E21B 33/14;
C09K 8/467; C09K 8/44; C09K 8/473
See application file for complete search history.

(56) References Cited

U.S. PATENT DOCUMENTS

| | | |
|---|---|---|
| 1,394,273 A | 10/1921 | Carrier et al. |
| 1,852,696 A | 4/1932 | Chaffee et al. |
| 2,465,278 A | 3/1949 | Schenker et al. |
| 3,221,548 A | 12/1965 | Wilson et al. |
| 3,265,151 A | 8/1966 | Anderson et al. |
| 3,303,461 A | 2/1967 | Edwards et al. |
| 3,308,426 A | 3/1967 | Wilson et al. |
| 3,691,518 A | 9/1972 | Schuster et al. |
| 3,696,884 A | 10/1972 | Lafleur et al. |
| 3,811,529 A | 5/1974 | Crawford |
| 3,884,710 A | 5/1975 | Allen et al. |
| 3,952,741 A | 4/1976 | Baker |
| 4,002,483 A | 1/1977 | Daugherty et al. |
| 4,205,994 A | 6/1980 | Moyer, Jr. et al. |
| 4,255,798 A | 3/1981 | Havira |
| 4,328,038 A | 5/1982 | Briggs |
| 4,332,619 A | 6/1982 | Gandy et al. |
| 4,391,329 A | 7/1983 | Gallus |
| 4,419,136 A | 12/1983 | Rice |
| 4,495,606 A | 1/1985 | Smith |
| 4,607,698 A | 8/1986 | Wood |
| 4,741,401 A | 5/1988 | Walles et al. |
| 4,757,479 A | 7/1988 | Masson et al. |
| 4,797,159 A | 1/1989 | Spangle |
| 4,871,179 A | 10/1989 | Bell et al. |
| 4,893,285 A | 1/1990 | Masson et al. |
| 4,986,354 A | 1/1991 | Cantu et al. |
| 5,118,527 A | 6/1992 | Wilson |
| 5,275,654 A | 1/1994 | Cowan |
| 5,650,004 A | 7/1997 | Yon |
| 5,741,357 A | 4/1998 | Sheikh |
| 5,942,031 A | 8/1999 | Cheung |
| 6,015,622 A | 1/2000 | Boe |
| 6,105,673 A | 8/2000 | Harris et al. |
| 6,209,646 B1 | 4/2001 | Reddy et al. |
| 6,675,895 B1 | 1/2004 | Shehab et al. |
| 6,743,470 B2 | 6/2004 | Pellerite et al. |
| 6,909,969 B2 | 6/2005 | Calvert et al. |
| 6,966,376 B2 | 11/2005 | Vaeth et al. |
| 7,150,317 B2 | 12/2006 | Barolak et al. |
| 7,156,174 B2 | 1/2007 | Roddy et al. |
| 7,494,544 B2 | 2/2009 | Go Boncan |
| 7,525,872 B2 | 4/2009 | Tang et al. |
| 7,663,969 B2 | 2/2010 | Tang et al. |
| 7,670,627 B2 | 3/2010 | Shefer et al. |
| 7,712,530 B1 | 5/2010 | Edgley et al. |
| 7,722,954 B2 | 5/2010 | Santra et al. |
| 7,773,454 B2 | 8/2010 | Barolak et al. |
| 7,988,782 B2 | 8/2011 | Rice et al. |
| 8,157,008 B2 | 4/2012 | Lilley |
| 8,336,620 B2 | 12/2012 | Williams et al. |
| 2001/0026863 A1 | 10/2001 | Hirano et al. |
| 2002/0037306 A1 | 3/2002 | Van Koppenhagen et al. |
| 2002/0166698 A1 | 11/2002 | Beato et al. |
| 2003/0156494 A1 | 8/2003 | McDaniel et al. |
| 2003/0216866 A1 | 11/2003 | Edward Calvert et al. |
| 2004/0109894 A1 | 6/2004 | Shefer et al. |
| 2004/0147406 A1 | 7/2004 | Go Boncan |
| 2004/0168801 A1 | 9/2004 | Reddy et al. |
| 2004/0234597 A1 | 11/2004 | Shefer et al. |
| 2005/0123596 A1 | 6/2005 | Kohane et al. |
| 2005/0167107 A1 | 8/2005 | Roddy et al. |
| 2005/0190648 A1 | 9/2005 | Tang et al. |
| 2005/0205248 A1 | 9/2005 | Barolak et al. |
| 2005/0234649 A1 | 10/2005 | Calvert et al. |
| 2006/0198243 A1 | 9/2006 | Tang et al. |
| 2006/0269752 A1 | 11/2006 | Holland et al. |
| 2007/0206439 A1 | 9/2007 | Barolak et al. |
| 2007/0219758 A1 | 9/2007 | Bloomfield |
| 2008/0073082 A1 | 3/2008 | Thiercelin |
| 2008/0131709 A1 | 6/2008 | Hanson et al. |
| 2010/0126718 A1 | 5/2010 | Lilley |
| 2011/0048701 A1 | 3/2011 | Williams et al. |
| 2011/0240302 A1 | 10/2011 | Coludrovich |
| 2012/0080184 A1 | 4/2012 | Jahangir et al. |
| 2012/0175118 A1 | 7/2012 | Khatri et al. |
| 2012/0188236 A1 | 7/2012 | Legendre et al. |
| 2013/0065755 A1 | 3/2013 | Taylor et al. |
| 2013/0161006 A1 | 6/2013 | Robisson et al. |
| 2014/0052376 A1 | 2/2014 | Guo et al. |
| 2014/0102704 A1 | 4/2014 | Patil et al. |
| 2014/0144634 A1 | 5/2014 | Nguyen et al. |
| 2015/0107493 A1 | 4/2015 | Rice |
| 2017/0121587 A1 | 5/2017 | Allouche et al. |
| 2017/0349805 A1* | 12/2017 | Musso .................. C09K 8/467 |

FOREIGN PATENT DOCUMENTS

| | | |
|---|---|---|
| DE | 19801610 A1 | 7/1999 |
| EP | 0073335 A1 | 3/1983 |
| EP | 0098778 A2 | 1/1984 |
| EP | 1275983 A2 | 1/2003 |
| EP | 1464959 B1 | 7/2006 |
| EP | 2169027 A1 | 9/2008 |
| EP | 2113546 A1 | 11/2009 |
| EP | 2246408 A2 | 11/2010 |
| EP | 2615151 A1 | 7/2013 |
| EP | 2676944 A1 | 12/2013 |
| EP | 1698912 B1 | 7/2016 |
| JP | S5841756 A | 3/1983 |
| JP | 2009263164 A | 11/2009 |
| RU | 2452758 C1 | 6/2012 |
| WO | 1988004729 A1 | 6/1988 |
| WO | 9322537 A1 | 11/1993 |
| WO | 2002087959 A2 | 11/2002 |
| WO | 03048526 A2 | 6/2003 |
| WO | 03106809 A1 | 12/2003 |
| WO | 2004088302 A1 | 10/2004 |
| WO | 2005030174 A1 | 4/2005 |
| WO | 2005061846 A1 | 7/2005 |
| WO | 2005089458 A2 | 9/2005 |
| WO | 2007041420 A2 | 4/2007 |
| WO | 2008034461 A1 | 3/2008 |
| WO | 2008047107 A1 | 4/2008 |
| WO | 2010140032 A2 | 12/2010 |
| WO | 2010141037 A1 | 12/2010 |
| WO | 2011126667 A1 | 10/2011 |
| WO | 2012027334 A1 | 3/2012 |
| WO | 2012177262 A1 | 12/2012 |
| WO | 2013023949 A2 | 2/2013 |
| WO | 2015047301 A1 | 4/2015 |
| WO | 2017137789 A1 | 8/2017 |

OTHER PUBLICATIONS

Chemical Abstracts, Chemical Abstracts Service (CAS), US, Mar. 25, 1991, XP000193363, ISSN: 0009-2258, abstract, p. 353.
Brufatto et al., "From Mud to Cement—Building Gas Wells": Oilfield Review Autumn 2003, p. 62-p. 76.
Zhen—New Cementing Technologies Successfully Solved the problems in shallow Gas, Low Temperature and Easy Leakage Formations, SPE131810—CPS/SPE International Oil & Gas Conference and Exhibition in China held in Beijing, China, Jun. 8-10, 2010 (17 pages).
Moroni et al., Achieving Long-tem isolation for thin gas zones in the Adriatic sea region, SPE92193—SPE Western Regional Meeting held in Irvine, CA, U.S.A., Mar. 30-Apr. 1, 2005 (11 pages).
Robert Van Kuijk et al: "A Novel Ultrasonic Cased-Hole Imager for Enhanced Cement Evaluation", Proceedings of International Petroleum Technology Conference, Jan. 1, 2005, (14 pages).
Boukhelifa et al., Evaluation of Cement Systems for Oil and Gas Wells Zonal Isolation in a Full-Scale Annular Geometry, SPE (56) References Cited

OTHER PUBLICATIONS

87195—IADC/SPE Drilling Conference held in Dallas, Texas, U.S.A., Mar. 2-4, 2004 (15 pages).
Belrute et al.,—Attenuation of Casing Cemented with Conventional and Expanding Cements Across Heavy-Oil and Sandstone Formations, SPE18027—SPE Drilling Engineering, Sep. 1992 (7 pages).
Wicks et al., "Modeling and Field Trials of the Effective Tractoring Force of Axial Vibration Tools", SPE 170327, SPE Deepwater Drilling and Completions Conference, Sep. 10-11, 2014, 11 pages.
American Concrete Institute 223R-10 Guide for the Use of Shrinkage-Compensating Concrete, 2010, 20 pages.
Musso et al., "Expanding Cement Compositions", U.S. Appl. No. 14/307,430, filed Jun. 17, 2016; 20 pages.
Van Kuijk et al., "A Novel Ultrasonic Cased-Hole Imager for Enhanced Cement Evaluation", IPTC 10546, Proceedings of International Petroleum Technology Conference, Jan. 1, 2005, 14 pages.
International Search Report and Written Opinion issued in International Patent Appl. No. PCT/IB2016/000270 dated Nov. 25, 2016; 29 pages.

\* cited by examiner

RELEASE OF EXPANSION AGENTS FOR WELL CEMENTING

BACKGROUND

The statements in this section merely provide background information related to the present disclosure and may not constitute prior art.

The present disclosure broadly relates to cement and cementing operations.

Hydraulic cement is any substance provided (at least at one time in the manufacturing process) in a powdered or granular form, that when mixed with a suitable amount of water, can form a paste that can be poured or molded to set as a solid mass. In the oil and gas industry, good bonding between set cement and casing, and also between set cement and the formation, are essential for effective zonal isolation. Poor bonding limits production and reduces the effectiveness of stimulation treatments. Communication between zones can be caused by inadequate mud removal, poor cement/formation bonding, expansion and contraction of the casing resulting from internal pressure variations or thermal stresses, and cement contamination by drilling or formation fluids. Under such circumstances a small gap or microannulus may form at the cement/casing interface, the cement/formation interface, or both.

The addition of charcoal with wood resin-coated aluminum particles for an expansive cement is disclosed in U.S. Pat. Nos. 4,332,619 and 4,328,038. The use of encapsulated gas and other expanding fluids is disclosed in U.S. Pat. Nos. 7,494,544 and 7,156,174.

Portland cement manufacturers have employed shrinkage-compensating cements that include an offsetting "expansive cement", which is a hydraulic cement that, after setting, increases in volume to significantly greater degree than Portland cement paste to form an expanded set cement as defined in the American Concrete Institute 223R-10 Guide for the Use of Shrinkage-Compensating Concrete (2010). Representative examples of shrinkage-compensating cement are found in U.S. Pat. No. 7,988,782, US20150107493 and U.S. Pat. No. 4,419,136.

Expansive cement has also been used in the oil and gas industry to cement wells. Representative examples of this technology are found in U.S. Pat. Nos. 2,465,278, 3,884,710, 4,002,483, 4,797,159, 5,942,031, 6,966,376, and U.S. Ser. No. 14/307,430. Use of expanding agents to cement wells is problematic since the expanding agents known in the art begin hydrating and thus begin to expand as soon as they contact water. Accordingly, if the expanding agent is going to expand the cement after the cement slurry is positioned within the well, the expanding agent cannot be added to the cement slurry mix water. Also, when the expansion agent is added to the slurry, the viscosity and/or yield stress of the slurry increase before the slurry can be placed and set. This is especially problematic when the cement slurry is exposed to increased temperature conditions such as are frequently encountered downhole in a well. Incorporation of expanding agents thus leads to difficulties in pumping and placement of the slurry, along with complicating job design.

Moreover, since the cement slurry is readily flowable, any hydration of the expanding agent that occurs before the cement begins to set does not contribute to producing a compressive force within the annulus of the well due to the expansion of the set cement.

Various efforts to delay expansion have been suggested. Coating of metal oxide particles with non-hydratable or previously hydrated minerals such as metal carbonates, hydroxides and hydrates was suggested in U.S. Pat. Nos. 4,332,619, 5,741,357, EP2169027A1; but these materials can be difficult to prepare and have had only limited success.

The cement industry in general, is in need of ways to improve the preparation, handling and design of hydraulic cements with hydratable expanding agents that address these problems and shortcomings; and the oil and gas industry is in need of ways to better and more controllably delay expansion of the expanding agents, and to improve the bonding between the set cement and the casing within the well annulus.

SUMMARY

Some embodiments of the present disclosure are directed to methods for radially pre-stressing a cement sheath within an annulus between the well casing and a surrounding barrier such that the expanded set cement, according to embodiments disclosed herein, is transversely compressed between, and bonded to, the well casing and the borehole wall and/or another tubular body concentric with the well casing.

In an aspect, embodiments are directed to methods to cement a subterranean well having a borehole disposed through a formation, comprising (i) preparing a cement slurry comprising water, hydraulic cement and a plurality of capsules comprising an expanding agent at least partially surrounded by a water permeable shell; (ii) placing the slurry in an annular region of the well between a first tubular body and a borehole wall, or between the first tubular body and a second tubular body; (iii) hardening the slurry to form an at least partially set cement; and (iv) infiltrating a portion of the water into the capsules hydrating and expanding the expanding agent to form an expanded set cement within the annular region.

In a further aspect, embodiments are directed to methods to determine the presence of cement behind a tubular body in a subterranean well having a borehole disposed through a formation, comprising: (i) preparing a cement slurry comprising water, Portland cement and a plurality of capsules comprising an expanding agent comprising calcium oxide, magnesium oxide, calcium sulfate hemihydrate, or a combination thereof, at least partially surrounded by a water permeable shell; (ii) placing the slurry in an annular region of the well between a first tubular body and a borehole wall, or between the first tubular body and a second tubular body; (iii) hardening the slurry to form an at least partially set cement; (iv) infiltrating a portion of the water into the capsules hydrating the expanding agent thereby expanding the expanding agent and rupturing the shell to form an expanded set cement within the annular region in compression with, and bonded to, the first tubular body and the borehole wall or in compression with, and bonded to, the first tubular body and the second tubular body, the water permeable shell selected to allow less than 50% relative expansion, based on the total percent expansion of the expanded set cement determined according to API-10B-5, prior to an initial set time for the cement slurry, and greater than 50% relative expansion, based on the total percent expansion of the expanded set cement determined according to API-10B-5, after the initial set time for the cement slurry determined according to ASTM C191-04a; and (v) introducing an acoustic logging tool into the first tubular body to measure acoustic impedance, amplitude, attenuation, bond index, or a combination thereof, the measurements taken azimuthally, longitudinally or both along the first tubular body.

In a further aspect, embodiments are directed to methods to maintain zonal isolation in a subterranean well having a borehole disposed through a formation, comprising: (i) preparing a cement slurry comprising water, Portland cement and a plurality of capsules comprising an expanding agent comprising calcium oxide, magnesium oxide, calcium sulfate hemihydrate, or a combination thereof, at least partially surrounded by a water permeable shell; (ii) placing the slurry in an annular region of the well between a first tubular body and a borehole wall; (iii) hardening the slurry to form an at least partially set cement; and (iv) infiltrating a portion of the water into the capsules hydrating the expanding agent thereby expanding the expanding agent and rupturing the shell to form an expanded set cement within the annular region in compression with and bonded to the first tubular body and the borehole wall to isolate a zone of the formation adjacent the expanded cement, the water permeable shell selected to allow less than 50% relative expansion, based on the total percent expansion of the expanded set cement determined according to API-10B-5, prior to an initial set time for the cement slurry, and greater than 50% relative expansion, based on the total percent expansion of the expanded set cement determined according to API-10B-5, after the initial set time for the cement slurry determined according to ASTM C191-04a.

In a further aspect, a cement slurry comprises water, a hydraulic cement and a plurality of capsules comprising an expanding agent comprising calcium oxide, magnesium oxide, calcium sulfate hemihydrate, or a combination thereof, at least partially surrounded by a water permeable shell; the water permeable shell selected to allow less than 50% relative expansion, based on the total percent expansion of the expanded set cement determined according to API-10B-5, prior to an initial set time for the cement slurry; and greater than 50% relative expansion, based on the total percent expansion of the expanded set cement determined according to API-10B-5, after the initial set time for the cement slurry determined according to ASTM C191-04a, in which the cement slurry sets to form an expanded set cement.

In still another aspect, a system for cementing a subterranean well in an annulus between a casing disposed within a borehole and a formation, comprises: a cement slurry comprising water, hydraulic cement and a plurality of capsules comprising an expanding agent at least partially surrounded by a water permeable shell; and a pumping system to place a stage of the slurry in the annulus.

DETAILED DESCRIPTION

The present disclosure will be described in terms of treatment of vertical wells, but is equally applicable to wells of any orientation. As used herein, "transverse" is intended to refer to a direction transverse to the axis of the well, e.g., the horizontal direction in a vertical well and vice versa. The disclosure will be described for hydrocarbon-production wells, but it is to be understood that the disclosed methods can be used for wells for the production of other fluids, such as water or carbon dioxide, or, for example, for injection or storage wells. It should also be understood that throughout this specification, when a concentration or amount range is described as being useful, or suitable, or the like, it is intended that any and every concentration or amount within the range, including the end points, is to be considered as having been stated. Furthermore, each numerical value should be read once as modified by the term "about" (unless already expressly so modified) and then read again as not to be so modified unless otherwise stated in context. For example, "a range of from 1 to 10" is to be read as indicating each and every possible number along the continuum between about 1 and about 10. In other words, when a certain range is expressed, even if only a few specific data points are explicitly identified or referred to within the range, or even when no data points are referred to within the range, it is to be understood that applicant appreciates and understands that any and all data points within the range are to be considered to have been specified, and that the applicant has possession of the entire range and all points within the range.

As used in the specification and claims, "near" is inclusive of "at." The term "and/or" refers to both the inclusive "and" case and the exclusive "or" case, whereas the term "and (or)" refers to the inclusive "and" case only and such terms are used herein for brevity. For example, a component comprising "A and/or B" may comprise A alone, B alone, or both A and B; and a component comprising "A and (or) B" may comprise A alone, or both A and B.

In this disclosure, the tubular body may be any string of tubulars that may be run into the wellbore and at least partially cemented in place. Examples include casing, liner, solid expandable tubular, production tubing, drill pipe, and the like. As used herein, a "set cement" refers to a cement which has set (e.g., been allowed to cure, allowed to harden, and the like) for a time greater than or equal to the "initial set time" as determined according to ASTM C191-04a, "Time of Setting of a Hydraulic Cement by Vicat Needle", or an equivalent thereof.

As used herein, a "bond" between a body within the wellbore and the expanded set cement refers to acoustically coupled contact between the body and the cement. Likewise, a bond between the expanded set cement and the borehole or formation wall refers to contact between the two such that the two are acoustically coupled and/or form a fluid-tight seal. For purposes herein, a well casing, e.g., a tubular body, also referred to herein as a tubular member, is acoustically coupled to the expanded set cement when the cement is shown to exist behind the Well casing by acoustic logging techniques known in the art. Accordingly, for purposes herein, a bond does not exist between a well casing and a cement sheath when a micro annulus or airspace is present between the two as shown by acoustic logging techniques. Likewise, as used herein, "compression" in the annular region refers to compression in the transverse direction against or between the first tubular member and the borehole wall or second tubular member due to expansion of the cement.

As used herein, a water permeable shell or material refers to an organic compound, and inorganic compound, or a combination thereof which allows infiltration of water there through. In embodiments, the water permeable shell may include components or sections which are at least partially soluble in water, which undergo a chemical reaction upon contact with water, which decompose upon contact with water, which undergo a phase transition under subject downhole conditions which allows water infiltration there through, or any combination thereof. In embodiments, a water permeable shell includes a shell which at least partially surrounds a core, but which has pores, voids, and/or discontinuities within the shell which allow water to pass through the shell and contact the core. As used herein, a water permeable shell may also include a shell which allows diffusion of water through the shell e.g., via partial solubility and/or osmosis.

The terms capsule, encapsulated expanding agent, expanding agent capsule, and the like are used interchangeably to refer to a capsule comprising a core within a water-permeable shell; which refer to a discrete particle having a core at least partially disposed within an inner space bound by the water-permeable material. (i.e., the water permeable shell). In other words, a core at least partially encapsulated within a water permeable shell.

As used herein, capsules may comprise a single-core arrangement or configuration, i.e., a single core at least partially contained within a water permeable shell (cf. FIG. 4) and/or may comprise a "matrix-island" arrangement or configuration in which the expanding agent is distributed at least partially within each particle or capsules as small islands within a matrix of the encapsulating or shell material (cf. FIG. 5), e.g., the expanding agent is dispersed as a discontinuous phase within the continuous shell material. Unless stated otherwise, reference to a capsule includes both single core-shell and matrix-island arrangements. In some embodiments, the core is homogenous. In other embodiments, the core may comprise various components.

For purposes herein, the percent expansion produced by setting or hardening of the cement slurry into the expanded set cement is determined according to API-10B-5 or an equivalent thereof. In this method, a ring shaped mold sealed on the top and bottom is filled to form a circular ring of cement. The mold has a stationary inner ring surrounded by an expandable outer ring which increases in circumference as the cement slurry inside the mold sets and expands. The test may be conducted at various temperatures and pressures. The percent expansion is determined by first measuring the distance M (mm) between two points on the outer ring at the time of filling the mold with the cement $T_0$ (e.g., measure $M_0$ (mm) @ $T_0$), and then again measuring the distance between these same two points after the cement has set to form the expanded set cement. This measurement is determined at the final time $T_f$ as specified in the method (e.g., $M_f$(mm) @ $T_f$). The total percent expansion is then determined by multiplying the difference between the final distance and the initial distance by a constant associated with the particular mold, according to the following formula:

Percent expansion=$(M_f-M_0)$*mold constant.

For purposes herein, this percent expansion obtained at the final time $T_f$ is referred to as the total percent expansion of the cement. This total percent expansion of the cement serves as the basis for all relative percent expansion determinations, as discussed herein. For purposes herein, the relative expansion of the cement slurry at a particular time ($T_1$), referred to as the percent relative expansion is equal to the percent expansion of the slurry (or setting cement) measured at a time $T_1$ divided by the total percent expansion achieved by the expanded set cement at $T_f$ determined according to API-10B-5. For purposes herein, the percent relative expansion may be determined at standard conditions of 25° C. and 1 atm of pressure, or at any suitable temperature and/or pressure specified for the intended end use. As an example, if a percent expansion at time $T_1$ is determined according to API-10B-5 to be 0.5%, and the total percent expansion at time $T_f$ is determined according to the same method under the same conditions to be 5%, the percent relative expansion of the cement slurry at time $T_1$ would be:

0.2%/2%*100%=10% relative expansion at $T_1$

Since the cement slurry being placed within the annulus of the wellbore is readily flowable, any expansion which occurs before the cement begins to set may increase the volume of the cement slurry, and is not thought to contribute to expansion within the annulus which produces the cement sheath transversely compressed therein. Accordingly, in embodiments, at least a percentage of the hydration of the expanding agent is delayed until after the initial set time of the cement, thereby delaying the expansion of the cement to a time after the slurry becomes more resistant to flow. This allows placement of the cement slurry within the annulus and at least partial setting of the cement prior to expansion of the cement.

In embodiments, the delay in expansion of the cement slurry is determined relative to the initial set time, the final set time, or a combination thereof for the cement slurry. The initial set time and, the final set time are determined according to ASTM C191-04a, an equivalent thereof. The initial set time and/or the final set time may be determined at standard temperatures and pressures, or at the temperature and pressure specified. The relative expansion properties of the cement slurry at various times, or within various time intervals, are determined relative to the total amount of expansion (the total percent expansion) obtained by the cement slurry, utilizing the percent expansion determined according to API-10B-5.

In embodiments the composition and/or arrangement of the outer shell is selected to delay hydration of the expanding agent. In embodiments the shell is selected to delay hydration of the expanding agent for a time such that prior to an initial set time for the cement slurry, determined according to ASTM C191-04a, or an equivalent thereof, the percent relative expansion of the cement slurry, if any, is less than 50%, based on the total percent expansion of the expanded set cement determined according to API-10B-5.

In embodiments, the shell is selected to delay hydration of the expanding agent for a time such that prior to an initial set time for the cement slurry, determined according to ASTM C191-04a, or an equivalent thereof, the percent relative expansion of the cement slurry, if any, is less than 50%, based on the total percent expansion of the expanded set cement determined according to API-10B-5, and after the initial set time for the cement slurry, the percent relative expansion of the cement slurry is greater than 50%, based on the total percent expansion of the expanded set cement.

In embodiments, the shell is selected to delay hydration of the expanding agent for a time such that prior to the initial set time of the cement slurry, determined according to ASTM C191-04a, or an equivalent thereof, the percent relative expansion, if any, is less than 40%, or less than 30%, or less than 20%, or less than 10%, based on the total percent expansion of the expanded set cement determined according to API-10B-5, and/or after the initial set time for the cement slurry, the percent relative expansion of the cement slurry is greater than 50%, or greater than 60%, or greater than 70%, or greater than 80%, or greater than 90%, based on the total percent expansion of the expanded set cement.

In embodiments the shell is selected to delay hydration of the expanding agent for a time such that prior to an initial set time for the cement slurry, determined according to ASTM C191-04a, or an equivalent thereof, the percent relative expansion of the cement slurry, if any, is less than 50%, based on the total percent expansion of the expanded set cement determined according to API-10B-5, and after the initial set time for the cement slurry, and prior to the final set time for the cement slurry, determined according to ASTM C191-04a, the percent relative expansion of the cement slurry is greater than 50%, or greater than 60%, or greater than 70%, or greater than 80%, or greater than 90%, based on the total percent expansion of the expanded set cement determined according to API-10B-5.

In embodiments the shell is selected to delay hydration of the expanding agent for a time such that prior to a final set time for the cement slurry, determined according to ASTM C191-04a, or an equivalent thereof, the percent relative expansion of the cement slurry, if any, is less than 50%, based on the total percent expansion of the expanded set cement determined according to API-10B-5, and after the final set time for the cement slurry, the percent relative expansion of the cement slurry is greater than 50%, or greater than 60%, or greater than 70%, or greater than 80%, or greater than 90%, based on the total percent expansion of the expanded set cement.

Figure 6:
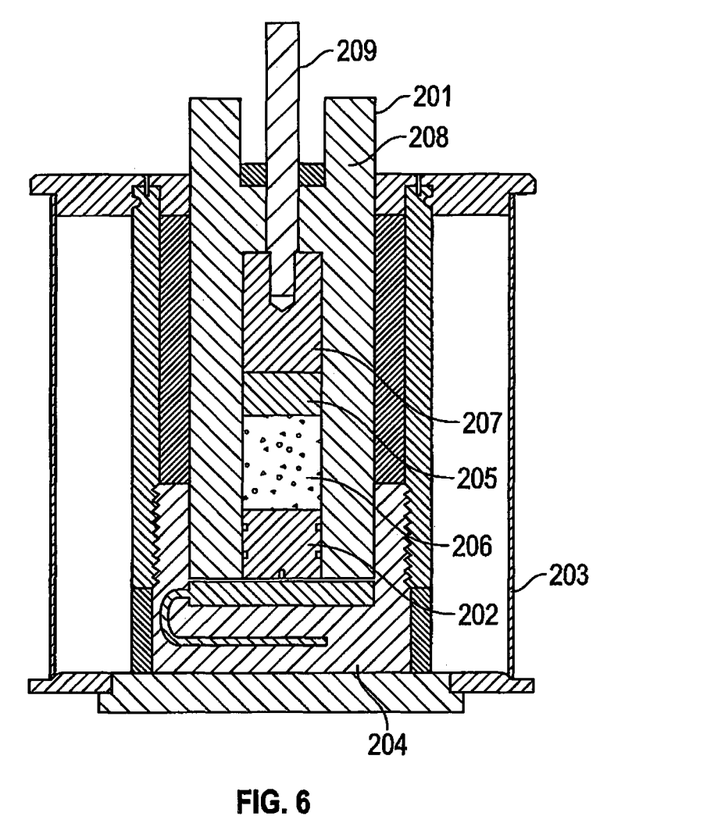
FIG. 6 shows a diagram of an apparatus for measuring cement expansion and pre-stress development.

Utilizing this test, the ability of the shell to delay hydration of the expanding agent may be determined to meet requirements of a particular cementing operation. In embodiments, other method to determine the delay of hydration of the expanding agent may be used including differential scanning calorimetry, a temperature-controlled confinement cell used to measure the effects of expanding agents under confined as shown in FIG. 6, and the like.

In an aspect, embodiments relate to a cement slurry comprising water, a hydraulic cement and a plurality of capsules comprising an expanding agent comprising calcium oxide, magnesium oxide, calcium sulfate hemihydrate, or a combination thereof, at least partially surrounded by a water permeable shell; the water permeable shell selected to allow less than 50% relative expansion, based on the total percent expansion of the expanded set cement determined according to API-10B-5, prior to an initial set time for the cement slurry, and greater than 50% relative expansion, based on the total percent expansion of the expanded set cement determined according to API-10B-5, after the initial set time for the cement slurry determined according to ASTM C191-04a in which the cement slurry sets to form an expanded set cement.

In embodiments, the water permeable shell comprises a deformation or discontinuity which impedes but do not entirely eliminate infiltration of water into the core for a period of time sufficient to allow less than 50% relative expansion, based on the total percent expansion of the expanded set cement determined according to API-10B-5, prior to an initial set time for the cement slurry, and which results in rupture of the shell after allowing greater than 50% relative expansion, based on the total percent expansion of the expanded set cement determined according to API-10B-5, after the initial set time for the cement slurry determined according to ASTM C191-04a; to form the expanded set cement.

In another aspect, embodiments relate to methods for cementing a subterranean well having a borehole disposed through a formation, comprising the steps of: (i) preparing a cement slurry comprising water, hydraulic cement and a plurality of capsules comprising an expanding agent at least partially surrounded by a water permeable shell; (ii) placing the slurry in an annular region of the well between a first tubular body and a borehole wall, or between the first tubular body and a second tubular body; (iii) hardening the slurry to form an at least partially set cement; and (iv) infiltrating a portion of the water into the capsules hydrating the expanding agent thereby expanding the expanding agent to form an expanded set cement within the annular region.

In embodiments, the expanding agent comprises a metal oxide which hydrates to form the corresponding metal hydroxide. Examples include calcium oxide, magnesium oxide, calcium sulfate hemihydrate, or combinations thereof. In embodiments, the water permeable shell comprises a polymer having a glass transition temperature (Tg) above about 25° C. and below 100° C. when determined according to ASTM D3418-15, or an equivalent thereof. In embodiments, the water permeable shell comprises a polyester, a polyacrylate, an epoxy, polyhydroxyacid, a polypeptide, a polyesteramide, a polysulfide, a polysiloxane, a block copolymer comprising blocks joined through ester bonds, a block copolymer comprising blocks joined through amide bonds, silica, a metal oxide, a metal hydroxide, and/or a metal halide comprising a metal selected from Group 2 through 15 of the period table, or a combination thereof.

In embodiments, the water permeable shell comprises poly-glycolic acid, poly-lactic acid-c-glycolic acid, poly-L-lactic acid, poly-L/D-lactic acid, poly-L/D-lactide-co-glycolic acid, polydimethylsiloxane, polyphenylmethyl siloxane, polydiphenylsiloxane, polyvinyl alcohol, a polyhydroxy $C_1$-$C_{20}$ alkyl acrylate copolymer, an epoxy resin, a dihydroxy-terminated $C_2$-$C_{20}$ polyamide, a dihydroxy-terminated $C_2$-$C_{20}$ polyamine, a dihydroxy-terminated polycarbonate, an $C_1$-$C_{20}$ aliphatic or aromatic polybasic acid, a $C_1$-$C_{20}$ amide, a $C_2$-$C_{20}$ acid anhydride, polymaleic anhydride, a $C_2$-$C_{20}$ polybasic acid alkyl ester, a $C_2$-$C_{20}$ polybasic acid halide, a $C_2$-$C_{20}$ imide, a $C_2$-$C_{20}$ bisimide, a $C_2$-$C_{20}$ polysulfonic acid, polystyrenesulfonic acid, or a combination thereof.

In embodiments, the infiltration of a portion of the water into one or more of the plurality of capsules comprises entry of the water through a discontinuity (e.g., an imperfection) in the water permeable shell. In embodiments, the infiltration of a portion of the water into one or more of the plurality of capsules comprises diffusion through at least a portion of the water permeable shell. In embodiments, the infiltrating of the portion of the water into one or more of the plurality of capsules hydrates the expanding agent thereby expanding the expanding agent in an amount sufficient to rupture the water permeable shell.

In embodiments, the cement slurry comprises an amount of expanding agent sufficient to form the expanded set cement transversely compressed between, and bonded to, the first tubular body and the borehole wall, or the first tubular body and the second tubular body. In embodiments, the bond between the first tubular body and the expanded set cement and the bond between the borehole wall and the expanded set cement are each sufficient to isolate a zone of the formation adjacent the expanded set cement.

In embodiments, the bond between the first tubular body and the expanded set cement is maintained after fluctuating the dimensions of the first tubular body in response to a temperature change, a pressure change, a mechanical disturbance resulting from a well intervention, or a combination thereof. In embodiments, the bond between the borehole wall and the expanded set cement or the bond between the second tubular body and the expanded set cement is maintained after fluctuating the dimensions of the first tubular body in response to the temperature change, the pressure change, the mechanical disturbance resulting from the well intervention, or combinations thereof. In such embodiments, the mechanical disturbance resulting from the well intervention may comprise measuring an acoustic impedance, an amplitude, an attenuation, a bond index, or a combination thereof.

In embodiments, the expanding agent is present in the cement slurry at a concentration greater than or equal to about 0.1 weight percent based on the total weight of hydraulic cement present, or greater than or equal to about 0.5 weight percent, or greater than or equal to about 1 weight percent, or greater than or equal to about 5 weight percent, or greater than or equal to about 7 weight percent, or greater than or equal to about 10 weight percent, or greater than or equal to about 14 weight percent, or greater than or equal to about 20 weight percent, and less than or equal to about 30 weight percent, or less than or equal to about 25 weight percent, based on the total weight of hydraulic cement present. In embodiments, the expanding agent is present in the cement slurry at a concentration between about 1 weight percent and 30 weight percent, or between about 5 weight percent and 30 weight percent, or between about 10 weight percent and 25 weight percent, based on the total weight of hydraulic cement present.

In embodiments, the amount of expanding agent present in the slurry is suitable to produce from 0.1 percent to 5 percent total expansion of the cement slurry upon hardening into an expanded set cement as determined according to API 10B-5 or an equivalent thereof, e.g., from 0.2 to 3 percent total expansion, or from 0.5 to 2 percent total expansion.

In embodiments, the cement slurry according to the instant disclosure is prepared which comprises water, hydraulic cement and capsules comprising a core of an expanding agent at least partially surrounded by (e.g., encapsulated within) a water-permeable shell (see FIG. 1). The slurry is then placed in an annular region between a first tubular body (e.g., the well casing) and a borehole wall or a second tubular body (see FIGS. 2 and 3). The slurry is then allowed to at least partially set e.g., allowed to harden, to form a set cement i.e., allowed to set for a time greater than or equal to the first or initial set time measured for the cement slurry when determined according to ASTM C191-04a, or an equivalent thereof. In addition, the method includes infiltrating a portion of the water present in the slurry into the capsules which, in embodiments, hydrates the expanding agent causing the expanding agent to expand. In embodiments, this expansion may cause the water permeable shell to rupture, thus releasing or reducing the inhibition of the water contacting the expanding agent. Expansion of the expanding agent forms an expanded set cement within the annular region. In embodiments, the expanded set cement is radially pre-stressed within the cement sheath, i.e., the expanded set cement is transversely compressed between the first tubular body and the borehole wall, or the first tubular body and the second tubular body.

In some embodiments, the expansion of the expanding agent ruptures the shell of the capsules and thereby release and/or allow and/or accelerate further hydration of the expanding agent. In some embodiments, the amount of capsules, i.e., the amount of expanding agent present in the cement slurry is sufficient such that hydration of the expanding agent expands the set cement to a state of compression within the annular region and facilitates maintenance of a bond with the first tubular member and the borehole wall or second tubular member.

The method may further comprise fluctuating the dimensions of the first tubular body, e.g., allowing the dimensions of the tubular body to fluctuate in response to a temperature change, a pressure change, or a mechanical disturbance resulting from a well intervention or a combination thereof. The method may also further comprise transversely compressing the set cement between the first tubular body and the borehole wall or second tubular body to maintain bonding therewith, e.g., allowing the set cement to expand and/or to maintain the state of compression, during and/or after the dimensional fluctuation of the first tubular body.

In a further aspect, embodiments relate to methods for maintaining zonal isolation in a wellbore. A cement slurry is prepared that comprises water, hydraulic cement and capsules comprising a water-permeable shell encapsulating an expanding agent core. The slurry is then placed in an annular region between a first tubular body and a borehole wall or a second tubular body. The slurry is hardened, e.g., allowed to harden, to form an at least partially set cement. Water is infiltrated, e.g., allowed to infiltrate, into the capsules to hydrate the expanding agent in the core. The set cement is expanded to compress against and bond with the borehole wall to isolate a zone of the formation adjacent the expanded cement. The compression and bond are maintained adjacent the isolated zone after dimensions of the first tubular body are fluctuated, e.g., allowed to fluctuate in response to a temperature change, a pressure change, or a mechanical disturbance resulting from a well intervention or a combination thereof.

In yet a further aspect, embodiments relate to methods for determining the presence of cement behind a tubular body in a subterranean well. A cement slurry is prepared that comprises water, hydraulic cement and capsules of an expanding agent, e.g., comprising a water-permeable shell at least partially surrounding a core compound, such as, for example, a core compound selected from the group consisting of calcium oxide, magnesium oxide, calcium sulfate hemihydrate, and combinations thereof. The slurry is then placed in an annular region between a first tubular body and a borehole wall or a second tubular body. The slurry is hardened, e.g., allowed to harden, to form a set cement. Water is infiltrated, e.g., allowed to infiltrate, into the capsules to hydrate the expanding agent (core compound) thereby causing the expanding agent to increase in size breaking the capsules and rupturing the shell. While maintaining the compression and bond, an acoustic logging tool is introduced into the tubular body. The tool measures acoustic impedance, amplitude, attenuation or a bond index or a combination thereof. In some embodiments, the measurements are taken azimuthally, longitudinally or both along the tubular body.

In embodiments, the viscosity of the cement slurry during placement (prior to the initial set time determined according to ASTM C191-04a) may be lower than 1000 cP at a shear rate of 100 s$^{-1}$. The hydraulic cement may comprise Portland cement, calcium aluminate cement, fly ash, blast furnace slag, lime, silica, a lime/silica blend, zeolites, magnesium oxychloride, a geopolymer, or a chemically bonded phosphate ceramic, or combinations thereof. In some embodiments the hydraulic cement consists of or consists essentially of Portland cement. In embodiments, the cement slurry may further comprise silica, diatomaceous earth, gilsonite, hematite, ilmenite, manganese tetraoxide, barite, glass or ceramic microspheres or combinations thereof.

For all aspects, the expanding agent or core compound may comprise an organic compound, an inorganic compound, or a combination thereof. In some embodiments, the expanding agent is an inorganic compound. In some embodiments, the expanding agent comprises calcium oxide, magnesium oxide, calcium sulfate hemihydrate, or combinations thereof.

In some embodiments, the water infiltration through the water permeable shell may occur by osmosis, increasing osmotic pressure within the encapsulating material, which may induce rupture of the shell to expose the remainder of the expanding agent to water present. The result may be an increase in the rate of hydration of the expanding agent. In some embodiments, the expanding agent is, or comprises an osmotic attractant which functions to draw water into the capsule, which in embodiments, bursts or otherwise ruptures the outer shell to expose the expanding agent to the water present. The rupture of the shell results in an increase in hydration and expansion of the expanding agent. In some embodiments, the water permeable shell may comprise or consists essentially of an osmotic attractant.

In embodiments, the selection of the water permeable shell may include selection of a plurality of layers, which may be the same or different in composition, thickness, or a combination thereof. In embodiments, the selection of the water permeable shell may include selecting the composition of the water permeable shell, increasing or decreasing the thickness of the encapsulating outer layer or layers of the water permeable shell (i.e., the number and composition of each shell layer, the thickness of each shell layer, or a combination thereof.

In embodiments, the water permeability of the outer layer or layers of the water permeable shell may be selected by selecting a coating composition having kinetics suitable to dissolve, disperse, and/or decompose upon contact with the water under down hole conditions over a suitable period of time; and/or selecting a coating composition which chemically reacts with water or another component present in the cement slurry to weaken the strength of the water permeable shell and/or the solubility of the water permeable shell in a controlled manner over a suitable period of time; and/or the thickness of the outer shell may be selected to prevent water from contacting the expanding agent for a suitable period of time. In embodiments, an inorganic component is dispersed within an organic matrix.

For example, a thicker shell layer may increase the strength or toughness of the core to resist rupture, as well as reduce hydraulic conductance, water infiltration, or the like. Likewise, the composition of the water permeable shell may be selected to have a lower water solubility to further delay water infiltration into the capsule. In other examples, a combination of shell layers having different properties may be selected to delay water infiltration into the capsule, thereby delaying hydration and subsequent expansion of the expanding agent until the cement slurry is properly placed within the annulus of the well bore and has begun to set i.e., allowed to set for a time greater than or equal to the first or initial set time measured for the cement slurry when determined according to ASTM C191-04a, or an equivalent thereof.

Figure 1A:
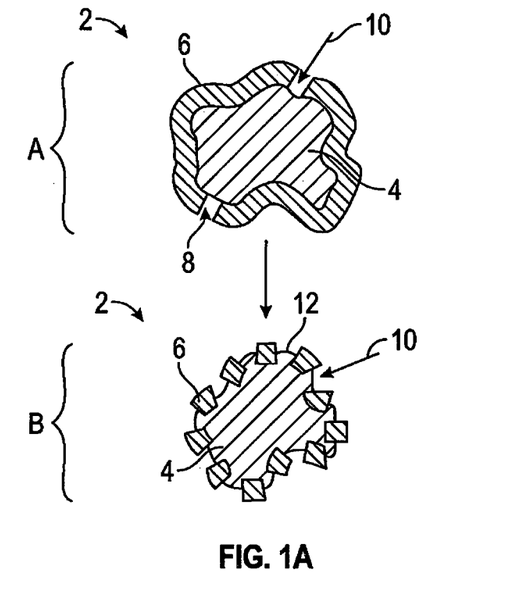
FIG. 1A is a schematic diagram showing a release mechanism for a capsule according to embodiments of the disclosure.

In the figures, like numerals are used to designate like parts. As shown in FIG. 1A, the capsule 2 comprises a core 4 comprising an expanding agent at least partially surrounded by a water permeable shell 6 comprising one or more discontinuities or imperfections 8. In the "A" stage, the water infiltrates (shown by arrow 10) through the imperfections 8 to contact the expanding material present in core 4, thereby hydrating and initiating expansion of the expanding agent. In the "B" stage, the core 4 is expanded and has ruptured the shell 6, thereby creating one or more enlarged openings 12 to activate the expanding agent to accelerate any further water infiltration 10, hydration and expansion of the core 4. The creation of the enlarged openings 12, whether by enlarging the imperfections 8 or rupturing the shell 6 or otherwise forming new openings, is referred to herein as "activating" the expanding agent.

Figure 1B:
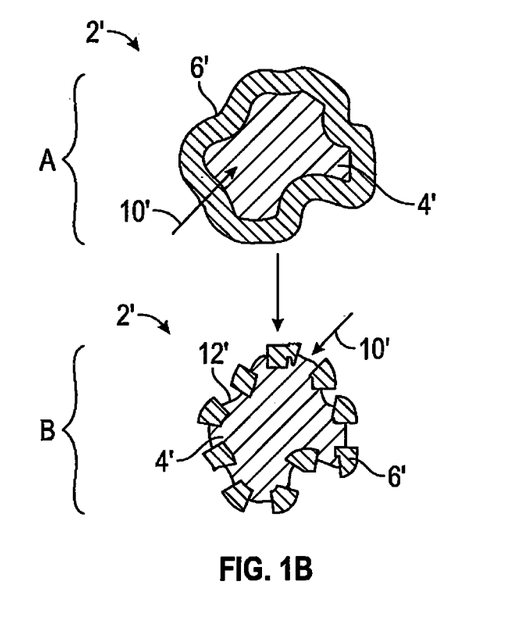
FIG. 1B is a schematic diagram showing another release mechanism for a capsule according to embodiments of the disclosure.

As shown in FIG. 1B, the capsule 2' comprises a core 4' comprising an expanding agent at least partially surrounded by a water permeable shell 6' comprising a water permeable component or a component which has become water permeable, e.g., by dissolution or other means under downhole conditions. In the "A" stage, the water infiltrates (shown by arrow 10') through the permeable shell 6' to contact the expanding material present in core 4', thereby hydrating and initiating expansion of the expanding agent. In the "B" stage, the core 4' is expanded and has ruptured the shell 6, thereby creating one or more enlarged openings 12' to activate the expanding agent to accelerate any further water infiltration 10', hydration and expansion of the core 4'. The enlarged openings 12' can be created to activate the expanding agent by dissolution of portion(s) of the shell 6', rupturing the shell 6' or otherwise forming the openings.

Figure 2:
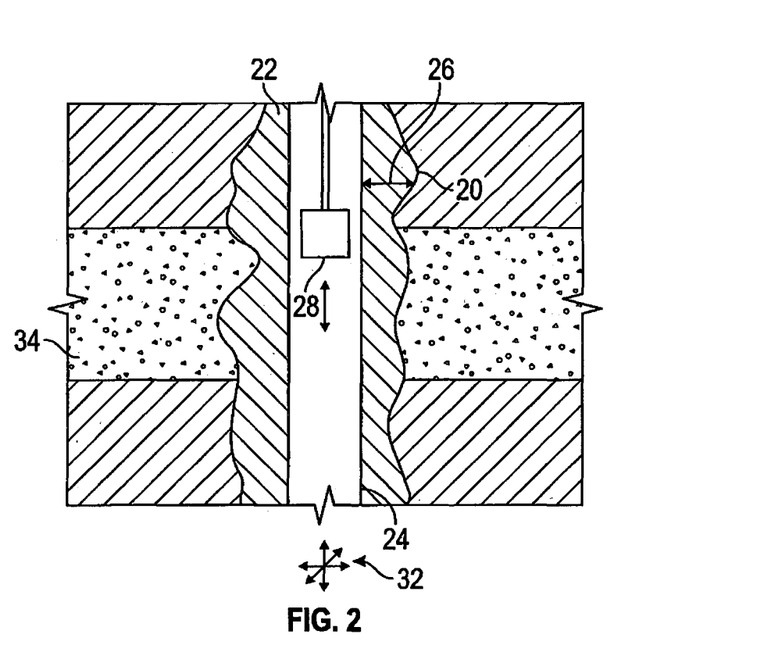
FIG. 2 shows a diagram of a well cemented according to embodiments of the disclosure.
Figure 3:
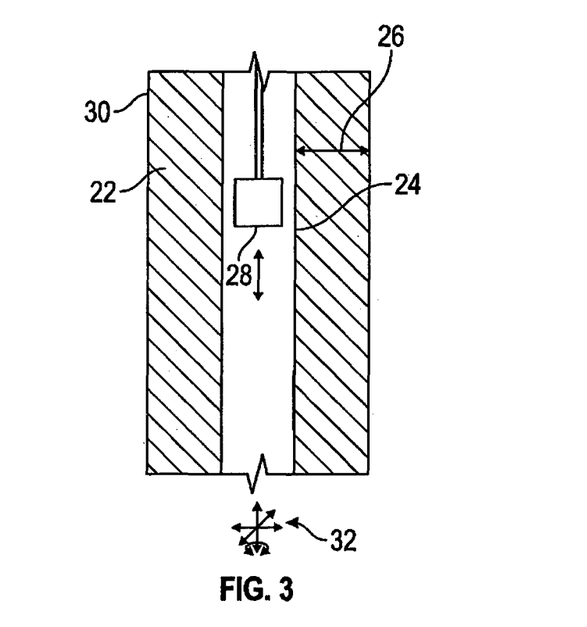
FIG. 3 shows a diagram of an annulus between two tubular members cemented according to embodiments of the disclosure.

With reference to some embodiments, borehole 20 and tubular member 30 are shown in FIGS. 2 and 3, respectively, wherein like numerals are used to designate like parts. The cement slurry comprising the capsules according to any embodiments disclosed herein is placed in the annulus 22 around the casing or other tubular member 24, set (initial and or final) in place, and with hydration of the expanding agent, expanded as indicated at 26 to induce a state of compression and facilitate bonding. The annulus 22 is shown between the tubular member 24 and the borehole wall 20 (FIG. 2) or the tubular member 30 (FIG. 3). The logging tool 28 is then introduced to take measurements as described in some embodiments herein, for example, to map impedance and determine the presence of cement in the annulus 22 behind the tubular member 24, or the absence thereof suggesting formation of a microannulus (not shown) between the tubular member 24 and the set cement in the annulus 22.

The tubular member 24 in FIGS. 2 and 3 (and/or tubular member 30 in FIG. 3) may be dimensionally changed in length, diameter, rotational alignment, etc., e.g., with respect to the wellbore 20 (FIG. 2) or the tubular member 30 (FIG. 3), some examples of which are indicated at 32. Expansion 26 of the cement set in the annulus 22 can occur before the dimensional change 32, and according to some embodiments of the disclosure, the state of compression of the cement is maintained in the annulus 22 during and/or after the dimensional change 32, e.g., by further expansion or increased compression to accommodate the changing dimension(s). Expansion 26 of the cement set in the annulus 22 can instead and/or also occur during and/or after the dimensional change 32, and according to some embodiments of the disclosure, the state of compression of the cement can be induced in the annulus 22 during and/or after the dimensional change 32.

With reference to FIG. 2, in some embodiments a zone 34 is isolated by placement, setting (initial and or final), and expansion 26 of the cement in the annulus 22. The compression and bonding can be maintained during dimensional change 32, e.g., so that the zone 34 remains in isolation and does not fluidly communicate via the annulus 22 with other zones in the formation.

As shown in FIGS. 2 and 3, in embodiments the cement slurry comprises an amount of expanding agent sufficient to form the expanded set cement transversely compressed between (due to expansion 26) and bonded to, the first tubular member (tubular body) 24 and the borehole wall, or the first tubular member (tubular body) 24 and the second tubular member (tubular body) 30.

As shown in FIG. 2, in embodiments, the bonds between the first tubular body 24 and the expanded set cement, and between the borehole wall and the expanded set cement are each sufficient to be acoustically coupled and/or to isolate a zone 34 of the formation adjacent the expanded set cement, e.g., from another zone. In some embodiments, the compression 26 and bonding can be maintained during dimensional change 32, e.g., so that the zone 34 remains in isolation and does not fluidly communicate via the annulus 22 with other zones.

Figure 4:
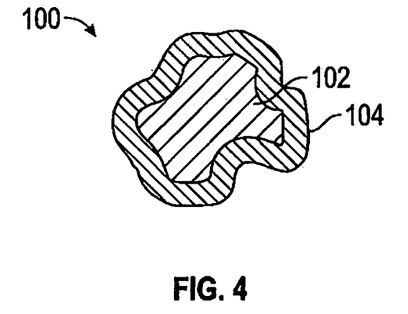
FIG. 4 shows a capsule having a single core-shell arrangement according to embodiments of the disclosure.
Figure 5:
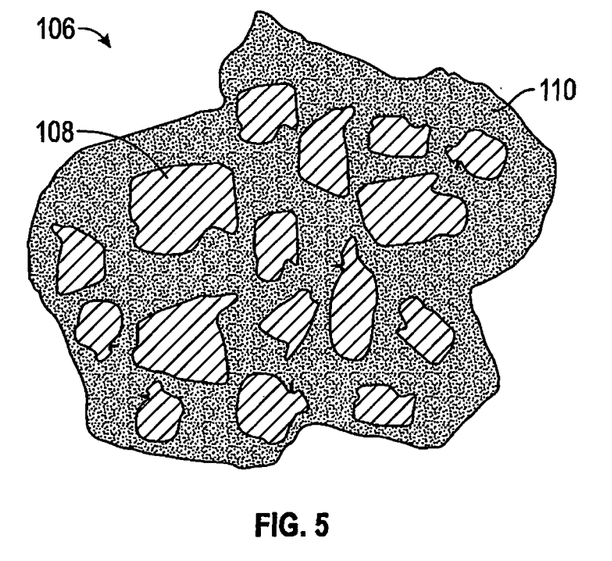
FIG. 5 shows a capsule having a matrix island arrangement according to embodiments of the disclosure.

For all aspects, the encapsulated expanding agent may be encapsulated by a material which traps the agent under (the Earth's) surface conditions, but releases the expanding agent within the borehole, e.g., by permeation of water through the shell and or rupture or degradation of the shell. In some embodiments, as shown in FIG. 4, the capsules comprise or consist essentially of capsules 100 having a single-core shell configuration, in which the expanding agent is arranged as a single core 102 at least partially surrounded by the water permeable shell 104. In some embodiments, as shown in FIG. 5, the capsules 106 comprise or consist essentially of capsules having a "matrix-island" configuration in which portions of the expanding agent 108 (only a representative amount are numbered for clarity) are dispersed as a discontinuous phase within the continuous shell 110. In some embodiments, the capsules may comprise a "matrix-island" configuration disposed around a single-core shell such that the capsules comprise both a single-core and a matrix-island configuration.

In some embodiments, core-shell type particles can release or expose the encapsulated expanding agent, e.g., all at once, if the shell is ruptured, which can occur mechanically and/or by chemical degradation. As used herein, "rupture" refers to any loss of integrity of the shell whether by tearing, bursting, and so forth. Matrix-island type cores can release the islands of expanding agent upon chemical degradation and/or dissolution of the matrix.

A number of materials may be used as encapsulating materials to form the shell. Examples include inorganic compounds which form a water permeable shell under conditions present within the formation. For example, an expanding agent may be enclosed within (i.e., at least partially encapsulated within) a shell comprising silica. Both fumed silica and precipitated silica become water soluble under the high pH (i.e., pH>10) present within the hydraulic cement as it sets. In embodiments, a number of organic polymers may be used alone or with inorganic compounds as encapsulating materials to form the water permeable shell which surrounds at least a portion of the expanding agent.

Activation of an encapsulated expanding agent over time may be brought about by means of an encapsulating material which dissolves slowly or undergoes chemical degradation under conditions encountered in the borehole, thereby making the encapsulating material permeable to allow the infiltration of water and or leading to rupture of the shell of core-shell type particles. In embodiments, an organic polymer which undergoes chemical degradation may have a polymer chain which incorporates chemical bonds which are liable to reaction, especially hydrolysis, under borehole conditions leading to cleavage of the polymer chain. A number of chemical groups may provide bonds which can be broken, including ester, acetal, sulfide, and amide groups. Polymers incorporating such groups include poly(hydroxyacids), polyesters, polypeptides, polyesteramides and polysulfides. In some embodiments, the expanding agent may be at least partially encapsulated within a shell comprising inorganic materials which become soluble at the relatively high pH present in the cement slurry. Examples include silica, which becomes soluble in aqueous mixtures above a pH of about 10.

In some embodiments, the water infiltration may form the expanded set cement without rupture of the shell. In some embodiments, the water infiltration may dissolve or otherwise degrade essentially all of the shell.

In some embodiments, the water permeability of the shell depends solely on deformations or discontinues within the shell which impedes but do not entirely eliminate infiltration of water into the core for a period of time; after which the expanding agent expands in an amount sufficient to increase and thus accelerate the hydration of the expanding agent to form the expanded set cement. For all aspects, the method may include encapsulating particles of the expanding agent, e.g., in advance of the preparation of the cement slurry. In some embodiments, the shell coating or other encapsulating material is selected to provide the desired rate of water infiltration and/or the desired time period between placement of the slurry and hydration and/or accelerated hydration of the expanding agent.

For all aspects, the coating imperfections (discontinuities) may be in an outer layer or shell comprising, for example, an organic polymeric coating, and/or an inorganic coating such as silica, alumina, aluminosilicate, or the like, including combinations thereof.

For all aspects, the diffusion may be through an outer layer or shell comprising, for example, a permeable polymeric layer or a polymeric layer that becomes permeable under conditions in the annular region in the borehole, including polymeric encapsulating materials such as polyester, polyacrylate, epoxy polymer, polylactide, polyglycolide, poly(lactic acid-c-glycolic acid), or the like, including combinations thereof. Specific representative examples of polymeric encapsulating materials include poly-L-lactic acid (PLLA), poly-L/D-lactic acid (PLDLA), poly-L/D-lactide-co-glycolic acid (PLGA), polydimethylsiloxane, polyphenylmethyl siloxane, polydiphenylsiloxane and combinations and/or copolymers thereof, and the like.

In some embodiments, cleavable groups are ester and amide groups, both of which provide bonds which can be broken by a hydrolysis reaction. Generally, the rate of cleavage on exposure to water is dependent upon the pH of the solution and its temperature. The hydrolysis rate of an ester group, for example, normally attains a maximum under high pH (alkaline) conditions that may exist in the slurry and/or upon dissolution of the expanding agent. Thus, the selection of encapsulating polymer in relation to the pH which will be encountered after the particles have been placed at the intended borehole location may provide a control over the delay before the expanding agent is released from the particles, and thus a delay in expansion of the set cement.

In some embodiments, the encapsulating material may be a polymer containing hydrolytically cleavable bonds, e.g., a block copolymer with the blocks joined through ester or amide bonds. Copolymers which contain blocks joined by ester linkages can be prepared by reaction of a pre-polymer with hydroxy groups and a second pre-polymer containing groups which are able to react with hydroxy groups, notably carboxylic anhydride, acyl halide, ketene, ester, sulfonic acid, or sulfonyl halide. One or both of the pre-polymers may itself be a polymer or oligomer. Prepolymers with reactive hydroxyl groups include oligosaccharides, synthetic polymers containing primary and secondary hydroxyl groups, such as polyvinyl alcohol) and poly(hydroxy alkyl (meth)acrylate) copolymers, poly(siloxanes), epoxy resins, dihydroxy-terminated poly(amides), dihydroxy-terminated poly(amines), and dihydroxy-terminated poly(carbonates). Examples of monomers or polymers containing groups that can be used to react with the hydroxyl-containing materials listed above to yield degradable ester links between polymer blocks include: aliphatic or aromatic polybasic acids, amides, acid anhydrides such as poly(maleic anhydride) and copolymers; polybasic acid alkyl esters, polybasic acid halides, imides, bisimides; and polysulfonic acids such as poly(styrenesulfonic acid).

In some embodiments, the release of the expanding agent can be induced by the temperature in the borehole. Some polymers allow negligible water infiltration and/or expanding agent release at ambient temperature, but more rapid infiltration or release at a higher temperature, e.g., in the borehole. Further, some polymers, e.g., amorphous polymers, may also become soft or flow above the glass transition temperature Tg as determined using differential scanning calorimetry, or an equivalent method. For example, an increase in permeability of the polymer may occur when the temperature is raised above the glass transition temperature Tg of the polymer, allowing water to infiltrate due to the increased permeability and/or the resulting osmotic pressure to more readily expand and rupture or form holes in the polymer layer due to the increased softness. To employ this mechanism of water infiltration/expanding agent release, an encapsulating matrix or shell polymer is selected to have Tg above ambient but below the temperature encountered in the borehole, e.g., a Tg above 30° C. or above 35° C. or above 40° C.

In some embodiments, although the rates of water infiltration, release of encapsulated expanding agent, and expansion of the cement may be predicted, the infiltration, release, and expansion profiles can also be observed in laboratory experiments before the particles are used. Such experiments involve exposing a sample quantity of the particles to conditions of pH and temperature which match those found in the borehole location and monitoring water infiltration and/or release of expanding agent over time, and/or formulating the cement slurry with the encapsulated particles and monitoring the expansion of the set cement upon exposure to the matching borehole conditions.

Some examples of documents which describe encapsulation procedures are U.S. Pat. Nos. 3,952,741, 4,741,401 and 4,986,354, which are hereby incorporated by reference. Additional relevant references include WO 1993/0022537, WO 2003/0106809, and WO 2010/0140032. The expanding agents are generally hydrophilic and/or water soluble and can, for example, be encapsulated in a double emulsion technique by (i) dissolving the encapsulating polymer in organic solvent, (ii) suspending the agent in particulated or powder form in the organic solution of the polymer, (iii) dispersing the resulting suspension in water, to form an emulsion in which the disperse phase is droplets of the organic solvent with agent particles suspended within these droplets, and (iv) stirring or otherwise agitating that emulsion while causing or allowing evaporation of the organic solvent, thereby forming agent particles in which the expanding agent is enclosed within a shell of the polymer. The particles can be recovered by filtration, washed, dried and stored until required for use.

Another manufacturing technique available for the production of particles with an expanding agent encapsulated within a polymer matrix include mixing the expanding agent with a polymeric or inorganic encapsulating material, e.g., in a melt or solid mixture, and then forming this mixture into particles, e.g., spray drying, coacervation, extrusion with subsequent chopping or cutting into the desired lengths, and the like.

In embodiments, a system for cementing a subterranean well in an annulus between a casing disposed within a borehole and a formation comprises a cement slurry according to one or more embodiments disclosed herein comprising water, hydraulic cement and a plurality of capsules comprising an expanding agent at least partially surrounded by a water permeable shell; and a pumping system to place a stage of the slurry in the annulus.

EMBODIMENTS LISTING

Accordingly, the present disclosure provides the following embodiments, among others:

E1. A method to cement a subterranean well having a borehole disposed through a formation, comprising:
  (i) preparing a cement slurry comprising water, hydraulic cement and a plurality of capsules comprising an expanding agent at least partially surrounded by a water permeable shell;
  (ii) placing the slurry in an annular region of the well between a first tubular body and a borehole wall, or between the first tubular body and a second tubular body;
  (iii) hardening the slurry to form an at least partially set cement; and
  (iv) infiltrating a portion of the water into the capsules hydrating and expanding the expanding agent to form an expanded set cement within the annular region.

E2. The method of embodiment E1, wherein the expanding agent comprises calcium oxide, magnesium oxide, calcium sulfate hemihydrate, or combinations thereof.

E3. The method of embodiment E1 or E2, wherein the water permeable shell comprises a polymer having a glass transition temperature (Tg) above about 25° C. and below 100° C. when determined according to ASTM D3418-15.

E4. The method according to any one of embodiments E1-E3, wherein the water permeable shell comprises a polyester, a polyacrylate, an epoxy, a polyhydroxyacid, a polypeptide, a polyesteramide, a polysulfide, a polysiloxane, a block copolymer comprising blocks joined through ester bonds, a block copolymer comprising blocks joined through amide bonds, silica, a metal oxide, a metal hydroxide, a metal halide, or a combination thereof, comprising a metal selected from Group 2 through 15 of the period table, or a combination thereof.

E5. The method according to any one of embodiments E1-E4, wherein the water permeable shell comprises poly-glycolic acid, poly-lactic acid-c-glycolic acid, poly-L-lactic acid, poly-L/D-lactic acid, poly-L/D-lactide-co-glycolic acid, polydimethylsiloxane, polyphenylmethylsiloxane, polydiphenylsiloxane, polyvinyl alcohol, a polyhydroxy $C_1$-$C_{20}$ alkyl acrylate copolymer, an epoxy resin, a dihydroxy-terminated $C_2$-$C_{20}$ polyamide, a dihydroxy-terminated $C_2$-$C_{20}$ polyamine, a dihydroxy-terminated polycarbonate, an $C_1$-$C_{20}$ aliphatic or aromatic polybasic acid, a $C_1$-$C_{20}$ amide, a $C_2$-$C_{20}$ acid anhydride, polymaleic anhydride, a $C_2$-$C_{20}$ polybasic acid alkyl ester, a $C_2$-$C_{20}$ polybasic acid halide, a $C_2$-$C_{20}$ imide, a $C_2$-$C_{20}$ bisimide, a $C_2$-$C_{20}$ polysulfonic acid, polystyrenesulfonic acid, or a combination thereof.

E6. The method according to any one of embodiments E1-E5, wherein infiltration of a portion of the water into one or more of the plurality of capsules comprises entry of the water through a discontinuity in the water permeable shell.

E7. The method according to any one of embodiments E1-E6, wherein infiltration of a portion of the water into one or more of the plurality of capsules comprises diffusion through at least a portion of the water permeable shell.

E8. The method according to any one of embodiments E1-E7, wherein the infiltrating of the portion of the water into one or more of the plurality of capsules hydrates the expanding agent thereby expanding the expanding agent in an amount sufficient to rupture the water permeable shell.

E9. The method according to any one of embodiments E1-E8, wherein the cement slurry comprises an amount of expanding agent sufficient to form the expanded set cement transversely compressed between, and bonded to, the first tubular body and the borehole wall, or the first tubular body and the second tubular body.

E10. The method according to embodiment E9, wherein the bond between the first tubular body and the expanded set cement and the bond between the borehole wall and the expanded set cement are each sufficient to isolate a zone of the formation adjacent the expanded set cement.

E11. The method according to any one of embodiments E9 or E10, wherein the bond between the first tubular body and the expanded set cement is maintained after fluctuating the dimensions of the first tubular body in response to a temperature change, a pressure change, a mechanical disturbance resulting from a well intervention, or a combination thereof.

E12. The method according to any one of embodiments E9-E11, wherein the bond between the borehole wall and the expanded set cement or the bond between the second tubular body and the expanded set cement is maintained after fluctuating the dimensions of the first tubular body in response to the temperature change, the pressure change, the mechanical disturbance resulting from the well intervention, or combinations thereof.

E13. The method according to any one of embodiments E9-E12, wherein the mechanical disturbance resulting from the well intervention comprises measuring an acoustic impedance, an amplitude, an attenuation, a bond index, or a combination thereof E14. The method according to any one of embodiments E1-E13, wherein the expanding agent is present in the cement slurry at a concentration between 1 weight percent and 30 weight percent, based on the total weight of hydraulic cement present.

E15. The method according to any one of embodiments E1-E14, wherein the hydraulic cement comprises Portland cement, calcium aluminate cement, fly ash, blast furnace slag, lime, silica, magnesium oxychloride, a geopolymer, zeolite, chemically bonded phosphate ceramic, or a combination thereof E16. The method according to any one of embodiments E1-E15, wherein the water permeable shell is selected to allow less than 50% relative expansion, based on a total percent expansion of the expanded set cement determined according to API-10B-5, prior to an initial set time for the cement slurry, and greater than 50% relative expansion, based on the total percent expansion of the expanded set cement after the initial set time for the cement slurry, determined according to ASTM C191-04a. The method according to embodiment E16, wherein greater than 50% relative expansion, based on the total percent expansion of the expanded set cement determined according to API-10B-5, occurs before a final set time for the cement slurry determined according to ASTM C191-04a.

E17. A method to determine the presence of cement behind a tubular body in a subterranean well having a borehole disposed through a formation, comprising:
(i) preparing a cement slurry comprising water, Portland cement and a plurality of capsules comprising an expanding agent comprising calcium oxide, magnesium oxide, calcium sulfate hemihydrate, or a combination thereof, at least partially surrounded by a water permeable shell;
(ii) placing the slurry in an annular region of the well between a first tubular body and a borehole wall, or between the first tubular body and a second tubular body;
(iii) hardening the slurry to form an at least partially set cement; and
(iv) infiltrating a portion of the water into the capsules hydrating the expanding agent thereby expanding the expanding agent and rupturing the shell to form an expanded set cement within the annular region in compression with, and bonded to the first tubular body and the borehole wall or in compression with, and bonded to the first tubular body and the second tubular body, the water permeable shell selected to allow less than 50% relative expansion, based on a total percent expansion of the expanded set cement determined according to API-10B-5, prior to an initial set time for the cement slurry, and greater than 50% relative expansion, based on the total percent expansion of the expanded set cement after the initial set time for the cement slurry, determined according to ASTM C191-04a; and
(v) introducing an acoustic logging tool into the first tubular body to measure acoustic impedance, amplitude, attenuation, bond index, or a combination thereof, the measurements taken azimuthally, longitudinally or both along the first tubular body.

E18. A method to maintain zonal isolation in a subterranean well having a borehole disposed through a formation, comprising:
(i) preparing a cement slurry comprising water, Portland cement and a plurality of capsules comprising an expanding agent comprising calcium oxide, magnesium oxide, calcium sulfate hemihydrate, or a combination thereof, at least partially surrounded by a water permeable shell;
(ii) placing the slurry in an annular region of the well between a first tubular body and a borehole wall;

(iii) hardening the slurry to form an at least partially set cement; and (iv) infiltrating a portion of the water into the capsules hydrating the expanding agent thereby expanding the expanding agent and rupturing the shell to form an expanded set cement within the annular region in compression with and bonded to the first tubular body and the borehole wall to isolate a zone of the formation adjacent the expanded cement, the water permeable shell selected to allow less than 50% relative expansion, based on a total percent expansion of the expanded set cement determined according to API-10B-5, prior to an initial set time for the cement slurry, and greater than 50% relative expansion, based on the total percent expansion of the expanded set cement after the initial set time for the cement slurry, determined according to ASTM C191-04a.

E19. The method according to embodiment E19, wherein the bond between the first tubular body and the expanded set cement, and the bond between the borehole wall and the expanded set cement, are maintained after fluctuating the dimensions of the first tubular body in response to a temperature change, a pressure change, a mechanical disturbance resulting from a well intervention, or a combination thereof.

C1. A cement slurry comprising water, a hydraulic cement and a plurality of capsules comprising an expanding agent comprising calcium oxide, magnesium oxide, calcium sulfate hemihydrate, or a combination thereof, at least partially surrounded by a water permeable shell which allows infiltration of a portion of the water into the capsules hydrating the expanding agent thereby expanding the expanding agent to form an expanded set cement; the water permeable shell selected to allow less than 50% relative expansion, based on a total % expansion of the expanded set cement determined according to API-10B-5, prior to an initial set time for the cement slurry, and greater than 50% relative expansion, based on the total percent expansion of the expanded set cement after the initial set time for the cement slurry, determined according to ASTM C191-04a.

C2. The cement slurry according to embodiment C1, wherein the water permeable shell comprises a deformation or discontinuity which impedes but do not entirely eliminate infiltration of water into the core for a period of time sufficient to allow less than 50% relative expansion, based on a total percent expansion of the expanded set cement determined according to API-10B-5, prior to an initial set time for the cement slurry, and which results in rupture of the shell there after allowing greater than 50% relative expansion, based on the total percent expansion of the expanded set cement after the initial set time for the cement slurry determined according to ASTM C191-04a; to form the expanded set cement.

C3. The cement slurry according to embodiment C1 or C2, wherein the expanding agent comprises calcium oxide, magnesium oxide, calcium sulfate hemihydrate, or combinations thereof.

C4. The cement slurry according to any one of embodiments C1-C3, wherein the water permeable shell comprises a polymer having a glass transition temperature (Tg) above about 25° C. and below 100° C. when determined according to ASTM D3418-15.

C5. The cement slurry according to any one of embodiments C1-C4, wherein the water permeable shell comprises a polyester, a polyacrylate, an epoxy, a polyhydroxyacid, a polypeptide, a polyesteramide, a polysulfide, a polysiloxane, a block copolymer comprising blocks joined through ester bonds, a block copolymer comprising blocks joined through amide bonds, silica, a metal oxide, a metal hydroxide, a metal halide, or a combination thereof, comprising a metal selected from Group 2 through 15 of the period table, or a combination thereof.

C6. The cement slurry according to any one of embodiments C1-C5, wherein the water permeable shell comprises poly-glycolic acid, poly-lactic acid-c-glycolic acid, poly-L-lactic acid, poly-L/D-lactic acid, poly-L/D-lactide-co-glycolic acid, polydimethylsiloxane, polyphenylmethyl siloxane, polydiphenylsiloxane, polyvinyl alcohol, a polyhydroxy $C_1$-$C_{20}$ alkyl acrylate copolymer, an epoxy resin, a dihydroxy-terminated $C_2$-$C_{20}$ polyamide, a dihydroxy-terminated $C_2$-$C_{20}$ polyamine, a dihydroxy-terminated polycarbonate, an $C_1$-$C_{20}$ aliphatic or aromatic polybasic acid, a $C_1$-$C_{20}$ amide, a $C_2$-$C_{20}$ acid anhydride, polymaleic anhydride, a $C_2$-$C_{20}$ polybasic acid alkyl ester, a $C_2$-$C_{20}$ polybasic acid halide, a $C_2$-$C_{20}$ imide, a $C_2$-$C_{20}$ bisimide, a $C_2$-$C_{20}$ polysulfonic acid, polystyrenesulfonic acid, or a combination thereof.

C7. The cement slurry according to any one of embodiments C1-C6, wherein infiltration of a portion of the water into one or more of the plurality of capsules comprises entry of the water through a discontinuity in the water permeable shell.

C8. The cement slurry according to any one of embodiments C1-C7, wherein infiltration of a portion of the water into one or more of the plurality of capsules comprises diffusion through at least a portion of the water permeable shell.

C9. The cement slurry according to any one of embodiments C1-C8, wherein the infiltrating of the portion of the water into one or more of the plurality of capsules hydrates the expanding agent thereby expanding the expanding agent in an amount sufficient to rupture the water permeable shell.

C10. The cement slurry according to any one of embodiments C1-C9, wherein the expanding agent is present in the cement slurry at a concentration between 1 weight percent and 30 weight percent, based on the total weight of hydraulic cement present.

C11. The cement slurry according to any one of embodiments C1-C10, wherein the hydraulic cement comprises Portland cement, calcium aluminate cement, fly ash, blast furnace slag, lime, silica, magnesium oxychloride, a geopolymer, zeolite, chemically bonded phosphate ceramic, or a combination thereof.

C12. The cement slurry according to embodiment C12, wherein greater than 50% relative expansion, based on the total percent expansion of the expanded set cement occurs before a final set time for the cement slurry determined according to ASTM C191-04a.

S1. A system for cementing a subterranean well in an annulus between a casing disposed within a borehole and a formation, comprising: a cement slurry comprising water, hydraulic cement and a plurality of capsules comprising an expanding agent at least partially surrounded by a water permeable shell which allows infiltration of a portion of the water into the capsules hydrating the expanding agent thereby expanding the expanding agent to form an expanded set cement; and a pumping system to place a stage of the slurry in the annulus.

S2. The system of embodiment S1, wherein the expanding agent comprises calcium oxide, magnesium oxide, calcium sulfate hemihydrate, or combinations thereof.

S3. The system of embodiment S1 or S2, wherein the water permeable shell comprises a polymer having a glass transition temperature (Tg) above about 25° C. and below 100° C. when determined according to ASTM D3418-15.

S4. The system according to any one of embodiments S1-S3, wherein the water permeable shell comprises a polyester, a polyacrylate, an epoxy, a polyhydroxyacid, a polypeptide, a polyesteramide, a polysulfide, a polysiloxane, a block copolymer comprising blocks joined through ester bonds, a block copolymer comprising blocks joined through amide bonds, silica, a metal oxide, a metal hydroxide, a metal halide, or a combination thereof, comprising a metal selected from Group 2 through 15 of the period table, or a combination thereof.

S5. The system according to any one of embodiments S1-S4, wherein the water permeable shell comprises polyglycolic acid, poly-lactic acid-c-glycolic acid, poly-L-lactic acid, poly-L/D-lactic acid, poly-L/D-lactide-co-glycolic acid, polydimethylsiloxane, polyphenylmethyl siloxane, polydiphenylsiloxane, polyvinyl alcohol, a polyhydroxy $C_1$-$C_{20}$ alkyl acrylate copolymer, an epoxy resin, a dihydroxy-terminated $C_2$-$C_{20}$ polyamide, a dihydroxy-terminated $C_2$-$C_{20}$ polyamine, a dihydroxy-terminated polycarbonate, an $C_1$-$C_{20}$ aliphatic or aromatic polybasic acid, a $C_1$-$C_{20}$ amide, a $C_2$-$C_{20}$ acid anhydride, polymaleic anhydride, a $C_2$-$C_{20}$ polybasic acid alkyl ester, a $C_2$-$C_{20}$ polybasic acid halide, a $C_2$-$C_{20}$ imide, a $C_2$-$C_{20}$ bisimide, a $C_2$-$C_{20}$ polysulfonic acid, polystyrenesulfonic acid, or a combination thereof.

S6. The system according to any one of embodiments S1-S5, wherein infiltration of a portion of the water into one or more of the plurality of capsules comprises entry of the water through a discontinuity in the water permeable shell.

S7. The system according to any one of embodiments S1-S6, wherein infiltration of a portion of the water into one or more of the plurality of capsules comprises diffusion through at least a portion of the water permeable shell.

S8. The system according to any one of embodiments S1-S7, wherein the infiltrating of the portion of the water into one or more of the plurality of capsules hydrates the expanding agent thereby expanding the expanding agent in an amount sufficient to rupture the water permeable shell.

S9. The system according to any one of embodiments S1-S8, wherein the cement slurry comprises an amount of expanding agent sufficient to form the expanded set cement transversely compressed between, and bonded to, the first tubular body and the borehole wall, or the first tubular body and the second tubular body.

S10. The system according to embodiment S9, wherein the bond between the first tubular body and the expanded set cement and the bond between the borehole wall and the expanded set cement are each sufficient to isolate a zone of the formation adjacent, the expanded set cement.

S11. The system according to any one of embodiments S1-S10, wherein the bond between the first tubular body and the expanded set cement is maintained after fluctuating the dimensions of the first tubular body in response to a temperature change, a pressure change, a mechanical disturbance resulting from a well intervention, or a combination thereof.

S12. The system according to any one of embodiments S1-S11, wherein the bond between the borehole wall and the expanded set cement or the bond between the second tubular body and the expanded set cement is maintained after fluctuating the dimensions of the first tubular body in response to the temperature change, the pressure change, the mechanical disturbance resulting from the well intervention, or combinations thereof.

S13. The system according to any one of embodiments S1-S12, wherein the mechanical disturbance resulting from the well intervention comprises measuring an acoustic impedance, an amplitude, an attenuation, a bond index, or a combination thereof.

S14. The system according to any one of embodiments S1-S13, wherein the expanding agent is present in the cement slurry at a concentration between 1 weight percent and 30 weight percent, based on the total weight of hydraulic cement present.

S15. The system according to any one of embodiments S1-S14, wherein the hydraulic cement comprises Portland cement, calcium aluminate cement, fly ash, blast furnace slag, lime, silica, magnesium oxychloride, a geopolymer, zeolite, chemically bonded phosphate ceramic, or a combination thereof.

S16. The system according to any one of embodiments S1-S15, wherein the water permeable shell is selected to allow less than 50% relative expansion, based on a total percent expansion of the expanded set cement determined according to API-10B-5, prior to an initial set time for the cement slurry, and greater than 50% relative expansion, based on the total percent expansion of the expanded set cement after the initial set time for the cement slurry, determined according to ASTM C191-04a.

S17. The system according to embodiment S16, wherein greater than 50% relative expansion, based on the total percent expansion of the expanded set cement occurs before a final set time for the cement slurry determined according to ASTM C191-04a.

EXAMPLE

The following example is provided to more fully illustrate the disclosure. This example is not intended to limit the scope of the disclosure in any way.

To measure the effects of expanding agents under confined conditions, a temperature-controlled confinement cell as shown in FIG. 6 can be employed. Radial confinement is provided by a hollow steel cylinder 201 with ID=2.86 cm (1.125 in.) and OD=7.62 cm (3 in.). The cylinder is sealed at the bottom with a removable metallic plug 202 that screws into the bottom and seals with two O-rings. This cell is designed such that the axial confinement from the top is provided by a piston 207 that slides easily inside the steel cylinder and is connected by a rod 209 to a programmable mechanical testing machine with a 5-kN load cell.

The steel cylinder can be screwed inside a heating/insulator chamber 203 where a glycol bath is heated up with a resistance heater 204. Tests can be performed at temperatures between room temperature and about 95° C. The upper limit is defined by the inability to prevent water escaping from the cement as vapor, since the device is not pressure-tight. Two thermocouples are placed near the heater and near the cement sample. They are connected to the heater power supply box and are used to maintain a fixed set-point temperature.

Two general modes of operation can be used with the expansion cell: fixed displacement of the piston (in which case the compressive load is measured) and fixed load applied to the piston (in which case the displacement of the piston is measured). The experiments here are conducted in fixed displacement mode.

To simulate hydration of cement placed against a permeable formation containing water, a porous ceramic disk 205 saturated with water can be placed on top of the cement sample 206, with a layer of filter paper between to keep the disk clean. The piston is then inserted into the cylinder until it makes contact with the porous disk. Additional water 208 is poured on top of the piston, and then finally a layer of high-boiling-point silicon oil is added to prevent evaporation of the water. Holes in the piston allow water access between the sample and borehole. As the cement and expanding agent react, volume lost to chemical shrinkage is replaced by external water flowing into the slurry from above, keeping the pores of the sample saturated. To simulate hydration of cement placed against a tight formation that supplies no water to the cement, the piston is placed directly in contact with the cement and a thick layer of lubricant is used to prevent water evaporation from the specimen. In this case, chemical shrinkage desaturates the pore system, causing some shrinkage that may not have been compensated by the encapsulated expanding agent, which is not released because insufficient water is present to infiltrate and burst the capsule.

Figure 7A:
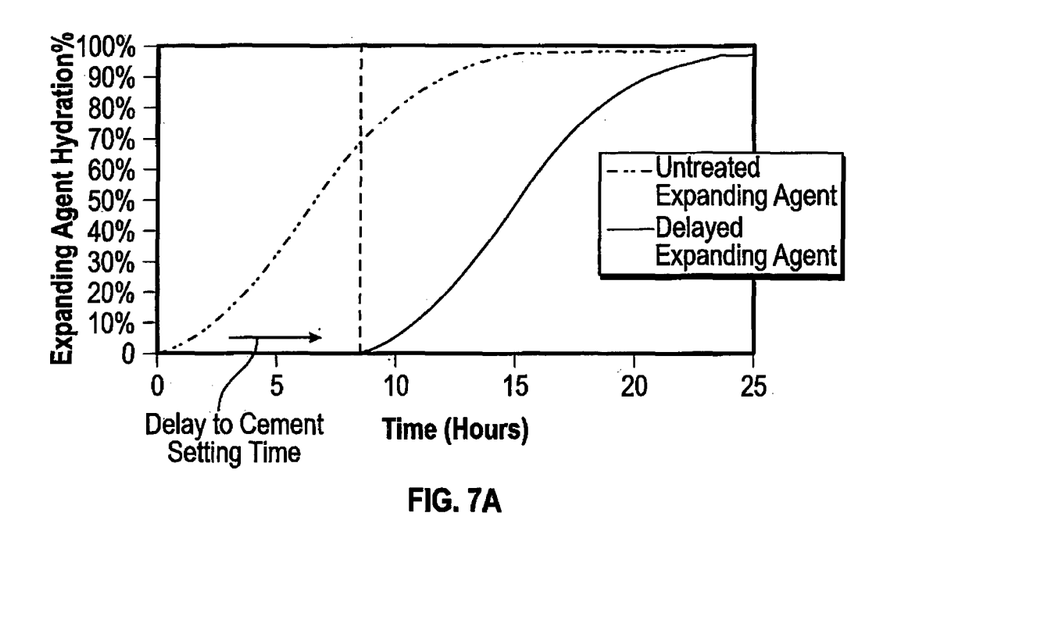
FIG. 7A qualitatively shows the expected results of confined cement expansion experiments with expanding agent capsules according to embodiments of the disclosure.

FIG. 7A qualitatively compares the hydration profiles of an untreated expanding agent and an encapsulated (delayed) expanding agent. The delay is tuned to the cement setting time, indicated by the dashed vertical line. The kinetics remain similar once the expanding agent is released. With the non-encapsulated (untreated) expanding agent, hydration of the expanding agent begins essentially on contact with water. The majority of the hydration occurs before the cement starts setting.

Figure 7B:
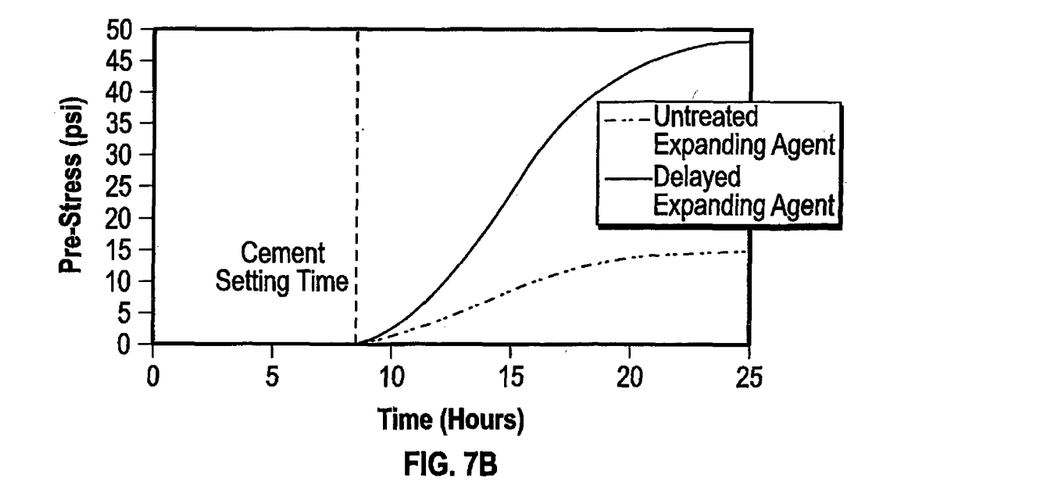
FIG. 7B qualitatively shows the expected results of confined cement expansion experiments with expanding agent capsules according to embodiments of the disclosure.

The expansion of the cement generates stress in the cement only after the cement has started setting (after the initial set time). FIG. 7B qualitatively shows the measured compressive stress for the two systems, a comparative untreated (non-encapsulated) expanding agent and an encapsulated (delayed) expanding agent according to embodiments disclosed herein. The initial set time of the cement is qualitatively observed in the figure as the time when stress starts being measured. Other means of determining the initial set time include consistency (viscosity), calorimetry since the cement setting reaction is exothermic, and the like. In this example, over 70% of the untreated expanding agent has been hydrated before the cement began setting. Accordingly, in the absence of encapsulation, only 30% of the expanding agent is available to contribute to forming compressive stress within the cement as it sets within the confined space of the annulus. In contrast, the encapsulated (delayed) xpanding agent, of this disclosure shows essentially no hydration of the expanding agent until after the cement begins to set. Accordingly, in the inventive example, essentially 100% of the expanding agent is available for hydration and thus essentially 100% of the expanding agent is able to generate compressive stress within the cement as it sets within the confined space of the annulus, as displayed in FIG. 7B.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112 (f) for any limitations of any of the claims herein, except for those in which the claim expressly uses the words 'means for' together with an associated function.

We claim:

1. A method to cement a subterranean well having a borehole disposed through a formation, comprising: (i) preparing the cement slurry comprising water, a hydraulic cement and a plurality of capsules with an expanding agent comprising calcium oxide, magnesium oxide, calcium sulfate hemihydrate, or a combination thereof, surrounded by a water permeable shell; (ii) placing the slurry in an annular region of the well between a first tubular body and a borehole wall, or between the first tubular body and a second tubular body; (iii) hardening the slurry to form an at least partially set cement; and (iv) waiting for infiltration of water into the capsules to hydrate and expand the expanding agent to form an expanded set cement within the annular region, wherein the water permeable shell is a polyester, a polyacrylate, an epoxy, a polyhydroxyacid, a polypeptide, a polyesteramide, a polysulfide, a polysiloxane, a block copolymer comprising blocks joined through ester bonds, or a block copolymer comprising blocks joined through amide bonds, or a combination thereof.

2. The method according to claim 1, wherein the water permeable shell comprises a polymer having a glass transition temperature (Tg) above about 25° C. and below 100° C. when determined according to ASTM D3418-15.

3. The method according to claim 1, wherein the bonds between the first tubular body and the expanded set cement, and between the borehole wall and the expanded set cement or between the second tubular body and the expanded set cement are maintained after fluctuating the dimensions of the first tubular body in response to a temperature change, a pressure change, a mechanical disturbance resulting from a well intervention, or a combination thereof.

* * * * *